UNITED STATES PATENT OFFICE.

CHARLES WILD, JR., OF VALATIE, NEW YORK.

COMPOSITION OF MATTER TO BE USED AS AN INDELIBLE MARKING AGENT.

No. 919,410.     Specification of Letters Patent.     Patented April 27, 1909.

Application filed October 8, 1906. Serial No. 337,882.

*To all whom it may concern:*

Be it known that I, CHARLES WILD, Jr., a citizen of the United States, residing at Valatie, in the county of Columbia and State of New York, have invented certain new and useful Improvements in Composition of Matter to be Used as an Indelible Marking Agent, of which the following is a specification.

My composition consists of the following ingredients, paraffin, printers' ink, and a coloring substance, preferably lamp black, ivory or bone powder, although white lead, or other coloring substances may be used. The paraffin is melted, and the other ingredients are thoroughly mingled with it by agitation, when the mixture is preferably placed in forms to harden.

This composition, which may be formed into crayons, will indelibly mark fabrics, and the goods so marked after passing through a bleach or dye will retain their marks legible and clear.

It is well known that at present it is difficult to identify the particular pieces of goods after they come out of the bleach or dye, because heretofore no marking composition has been made which will withstand the chemical action. By the use of my composition the goods may be marked and passed through the strongest bleaching or dyeing composition and the marks can be readily seen and read.

While I have described the use of paraffin, with coloring substances, in connection with printers' ink, I do not wish to limit myself to the use of paraffin particularly, since any basic substance which may be melted and will absorb or take up the printers' ink and coloring matter, such as tallow or other substance may be used, and, as stated above, different coloring substances may be used, thus giving to the crayons the ability to mark the goods white, black, green or any color desired, without departing from the spirit of my invention.

For one example of how my composition may be made up I give the following formula for a dozen crayons.

| | | |
|---|---|---|
| Paraffin | .0583 | ozs. |
| Lamp black | .00833 | " |
| Printers' ink | .00833 | " |

I may, however, change the proportions with reference to the character of the material upon which the composition is to be used.

What I claim as my invention, and desire to secure by Letters Patent is:

1. A composition of matter comprising paraffin, coloring substance and printers' ink, as hereinbefore set forth.

2. A composition of matter comprising printers' ink, a coloring substance and a basic substance with which the foregoing is melted and agitated, substantially as herein set forth.

In testimony whereof I have affixed my signature in presence of two witnesses.

CHARLES WILD, JR.

Witnesses:
   FREDERICK W. CAMERON,
   EDWIN D. HOWE.